May 29, 1956 L. H. BEDFORD 2,748,189

COLOR TELEVISION TRANSMISSION

Filed Jan. 5, 1954 3 Sheets-Sheet 1

May 29, 1956 L. H. BEDFORD 2,748,189

COLOR TELEVISION TRANSMISSION

Filed Jan. 5, 1954 3 Sheets-Sheet 2

May 29, 1956 L. H. BEDFORD 2,748,189

COLOR TELEVISION TRANSMISSION

Filed Jan. 5, 1954 3 Sheets-Sheet 3

Patented May 29, 1956

2,748,189

COLOR TELEVISION TRANSMISSION

Leslie Herbert Bedford, London, England, assignor to Marconi's Wireless Telegraph Company Limited, London, England, a British company Application January 5, 1954, Serial No. 402,357

Claims priority, application Great Britain January 6, 1953

4 Claims. (Cl. 178—5.4)

This invention relates to color television transmission and has for its object to provide improved and relatively simple means whereby a single camera tube may be employed to give separable color picture signals without involving the provision of any mechanically moving parts for deriving color transmission, without involving any addition, other than a fixed color filter system, to an ordinary "black and white" television transmitter to adapt it to produce separable color picture signals, and without giving rise to excessively arduous resolution requirements for the camera tube.

There are many known television receiver systems by which colored pictures may be reconstituted from separate component color picture signals. Thus, for example, in a three color system using the primary colors of red, blue and green, if red picture signals, blue picture signals and white (mere brightness) picture signals are separately available at the receiver, colored pictures may be, as is well known, reconstituted at said receiver from the three sets of signals, the green picture signals being derived by a subtractive method from the white, red and blue. This, and similar receiver arrangements are well known and, since they form no part of the present invention, will not be further described herein. They require, however, the provision of separate color picture signals. Such separate color picture signals can be, and often are, provided at the transmitter by means of a plurality of camera tubes one for each of the colors used. This, however, is objectionable since it necessitates the provision of a number of camera tubes with consequent extra cost both for the tubes themselves and for the apparatus required to ensure their correct co-operative operation, particularly geometrical registration.

The invention contained in British specification No. 16,681/52 enables separable color picture signals to be obtained from a television transmitter camera tube by interposing, in the picture imaging light path to the photo-electric cathode of said tube, a color filter device having regularly and differently spaced strips of different colors so arranged with respect to the direction of line scanning in the tube that, during scanning of said cathode to develop picture signals, different color picture signals are generated by said tube, said different signals being in effect carried upon different separable fundamental frequencies determined by the different intervals between the interruptions for each color.

A preferred form of filter device for use in carrying out the invention contained in specification No. 16,681/52 consists, in effect, as is described in that specification, of two superimposed sets of filter strips one set consisting of cyan strips side by side and the other set of yellow strips side by side, each having its own transparent (i. e. colorless) strips between colors. In the present specification the terms "cyan," "yellow" and "magenta" respectively denote red absorbing, blue absorbing, and green absorbing as applied to filters. They are the subtractive filters (sometimes called "minus red," "minus blue" and "minus green") familiar in certain forms of color photography. The filter device is interposed in the picture imaging light path to the photo-electric cathode of the single camera tube employed—it may be inside the tube adjacent said cathode or external to the tube and imaged on the cathode—and is of such shape and size as to cover the whole picture. All the strips of a set are aligned so as to be at right angles to the scanning line direction. The spacing of the red strips is, however, different from that of the blue strips, or in other words the "pitch" of the strips is different. For example, the pitch of the blue strips may be twice that of the red strips. It is, however, not necessary for the pitch relation (2 to 1 in the example just given) to be a simple numerical ratio although a simple numerical ratio has advantages as regards ease of manufacture of the filter device. The pitches chosen must, however, be finer than the required horizontal resolution in the brightness channel.

A filter device as described in the specification No. 16,681/52 has the important defect that, what may be termed the strip frequencies (i. e. the number of strips traversed per second during scanning) are very high and this involves excessively arduous resolution requirements for the camera tube. The present invention seeks to overcome this disadvantage.

Reconstruction of a visually satisfactory colored picture does not require so high a resolution as regards color information (chrominance signals) as is required for luminance signals (intensity information). Thus, to take present day British television standards of 405 lines per picture and 25 pictures per second by way of example, a satisfactory colored picture may be reconstructed from luminance signals occupying a band width of 2.5 mc./s. and chrominance signals occupying a band width of only 0.5 mc./s. for each color information channel. In order to avoid spurious beat frequency patterns, the lowest strip frequency employed (normally, in a three color system, that due to the cyan strips) should be about twice the highest luminance frequency i. e. (in the example just given) about 5 mc./s. If, as described in the co-pending specification referred to, the yellow strip frequency is made twice this value, the resolution requirements imposed on the camera become so great as to be most difficult to satisfy. From the point of view of easing resolution requirements, great practical advantages are to be obtained by keeping the strip frequencies as low as possible, e. g. by employing 6 mc./s. for the yellow strip frequency instead of 10 mc./s. If, however, this is attempted by using a filter device as described in the co-pending specification referred to, serious beat frequency interference may occur. The present invention seeks to overcome this difficulty and to provide improved filter devices which shall be such that the strip frequencies can be kept relatively low without causing serious beat frequency patterns. As will be seen later the same measures provided by this invention eliminate color "cross talk" as well as beat frequency patterns.

According to the present invention there is provided a color television system wherein separable color signals are obtained by interposing in the picture imaging light path to the photo-electric cathode of a camera tube, a color filter device having regularly and relatively differently spaced sets of filter strips, the sets being of different colors and the strips of any one set being chosen such that there is an interval in the color scale between the color at which the density of such one set falls away towards the density of the space between the filter strips thereof, and the color at which the density of another set of strips increases from the space density and approaches its maximum value, the filter device being such that the strip separation spaces are not of zero density, but of a density selected so as to ensure that light of any one color traversing the filter device is modulated by its associated set of filter strips but is substantially unmodulated by the filter strips associated with other wave lengths of light, the filter device being adapted to be arranged with respect to the direction of line scanning in the camera tube in such a way that during the scanning of said cathode to produce picture signals, different color picture signals are generated by said tube, the color picture signals being, in effect, carried upon different separable fundamental frequencies determined by the sequential positioning of said color strips in the sets thereof.

For a better understanding of the invention, and to show how the same may be carried into effect, reference will be made to the accompanying drawings, in which.

In the description in the present specification, as in the specification No. 16,681/52, strips of a set of filter strips are referred to as "red," "blue" and so on. These words are used for the sake of brevity but it is to be understood that they would be more accurately referred to as "minus red," "minus blue" and so on, a red filter strip being, within the meaning of this specification a strip which absorbs red light.

Figure 1:
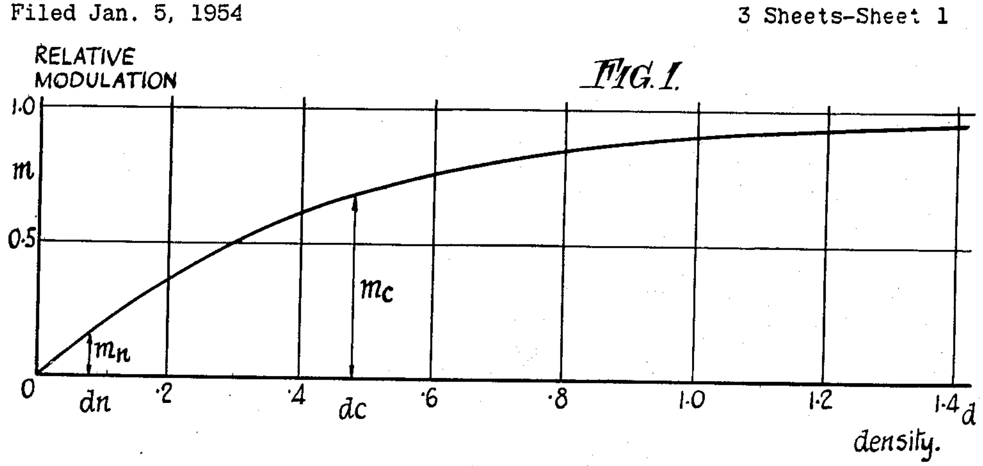
Fig. 1 shows the relation between density of a color filter as described in British application No. 16,681/52 and the relative modulation effected by the filter.

Consider the case of a cyan and yellow filter device constructed in two immediately adjacent layers, one consisting of a set of cyan strips spaced by colorless transparent strips and the other consisting of a set of yellow strips spaced by colorless transparent strips, as described in specification No. 16,681/52. Fig. 1 shows quantitatively the relative modulation $m$ (ordinates) constituting the color signal in terms of the density $d$ (abscissae) of the color strips. If the color strip density is $d_c$ and the strips are separated by clear spaces of zero density, the relative modulation is as given by the ordinate $m_c$ corresponding to abscissa $d_c$. In practice, of course, the cyan strips will not be of zero density for the whole range of colors below red nor will the yellow strips be of zero density for the whole range of colors above blue or blue-green. Accordingly, if the yellow strip frequency is made, in the interests of camera resolution, only a little above the cyan strip frequency (e. g. cyan strip frequency 5 mc./s. and yellow strip frequency 6 mc./s.), there will be produced spurious beat frequency patterns at the difference frequency (the lower the difference frequency the more visible will these patterns be) resulting in color cross talk as the scanning spot travels across the strips.

Still referring to Fig. 1, suppose that, instead of having clear spaces between the color strips, the spaces have density $d_n$. The relative modulation will no longer be $m_c$ but $m_c - m_n$.

Figure 2:
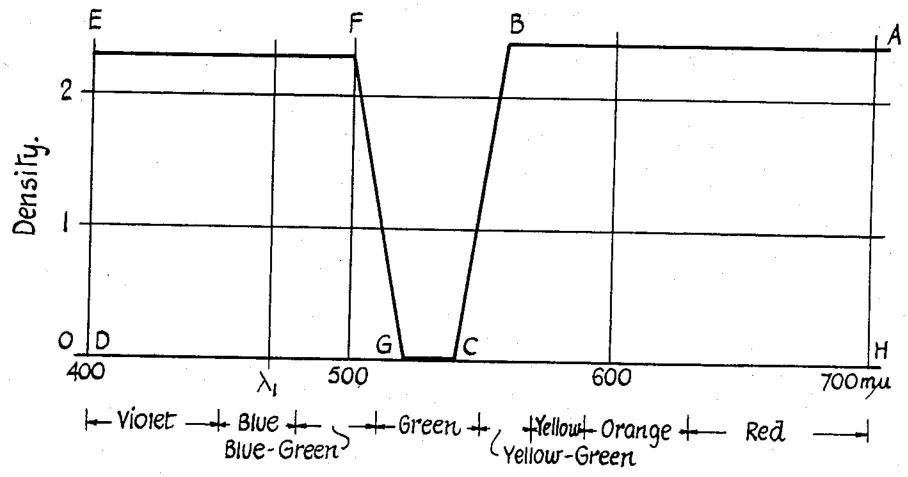
Fig. 2 shows graphically the spectral characteristics of a pair of idealized strip filters, the separating spaces between the filter strips being of zero density.

Referring now to Fig. 2 the spectral characteristics shown therein are those of a pair of idealized strip filters, the first filter being cyan and the second filter being yellow, there being an interval in the color scale between blue-green, (the color at which the density of the first filter falls away towards space density) and yellow-green (the color at which the density of the second filter increases towards maximum). Fig. 2 is drawn for the case in which the space density is zero. In practice a filter device having sets of strips with characteristics as shown in Fig. 2 is not at present attainable, the drawing illustrating, as stated, an idealized case. In Fig. 2 A, B, C, D is the characteristic of the cyan strip color which produces the red color signal and E, F, G, H that of the yellow strip color which produces the blue color signal. Since the portions C, D and G, H overlap, i. e. the wave length $\lambda_c$ of the color at the point C is greater than the wave length $\lambda_G$ of the color at the point G, beat patterns cannot arise for there is no wave length of light which will be modulated by both filters. For example, light of wave length $\lambda_1$ will be greatly modulated by the yellow filter but will not be modulated at all by the cyan one. Since a beat pattern can only be produced as the product of two modulations, there will be zero beat pattern.

Figure 3:
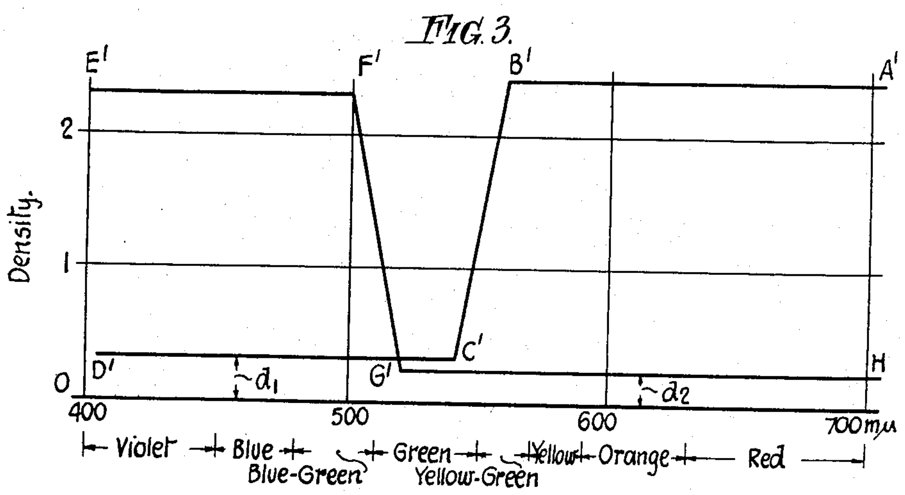
Fig. 3 shows graphically a spectral characteristic of a pair of less idealized strip filters the separating spaces between the filter strips being of uniform density.

In Fig. 3, the spectral characteristics shown therein are those of a slightly less idealized filter, wherein the spaces are not of zero density but are of uniform densities. The characteristics for cyan and yellow strip colors are marked A′, B′, C′, D′, and E′, F′, G′, H′ respectively. As in Fig. 2, the portions C′, D′ and G′, H′ overlap, but there are densities $d_1$ and $d_2$ respectively over these portions. By suitably choosing the spaces to have neutral densities equal to the values $d_1$, $d_2$, the result may be achieved that blue light is unmodulated in passing between the cyan strips and neutral density strips $d_1$ and red light is unmodulated as between the yellow strips and the neutral density strips $d_2$. Thus the beatless characteristic is maintained even though the dyes are nowhere of zero density.

Figures 4, 5, 6:
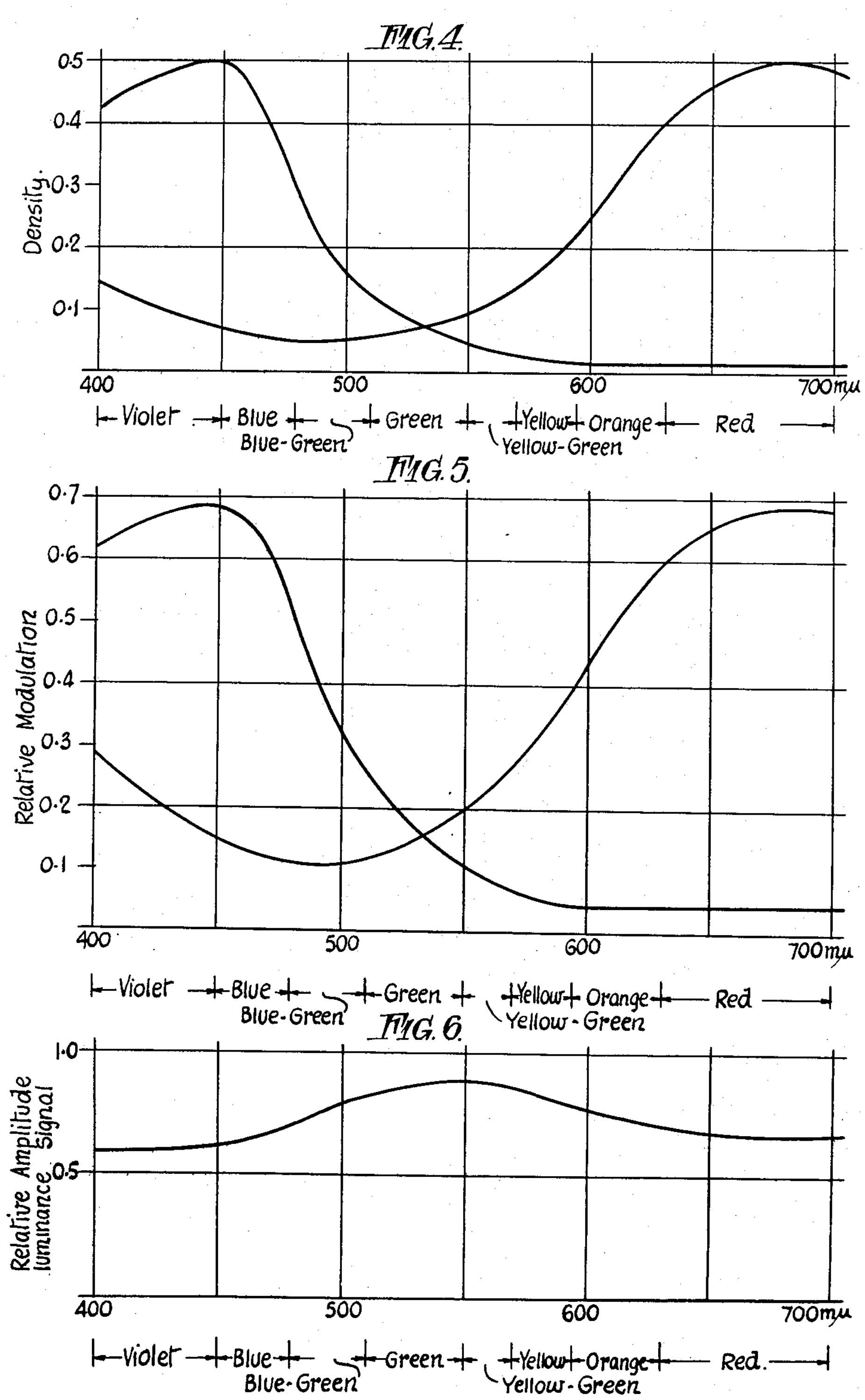
Fig. 4 shows a typical photographic filter characteristic curve.
Fig. 5 shows the relation between wave length and the relative modulation of the filters of Fig. 4, the spaces between the filter strips being of zero density.
Fig. 6 shows the relative amplitudes of the luminance signals obtained from the filters of Fig. 5.

The pair of filter characteristics shown in Fig. 4 are typical of those attainable in photographic practice, the dyes of the filters being shown as diluted to a maximum density of 0.5—a reasonable working figure. It will be noted that the photographic cyan dye has the objectionable characteristic of increasing density within the blue wave length, a feature which makes the attainment of beatless characteristics difficult and also introduces substantial blue-red cross talk. In fact, these two effects occur together since both arise from the same cause, namely modulation of light by both strip filters.

If, with filters as shown in Fig. 4 the spaces between the strips were left of zero density (i. e. clear) the relative modulation amplitudes of the color signals obtained would be as shown in Fig. 5, in which relative modulation is plotted, as ordinates, against wave length of light (m$\mu$) as abscissae. Fig. 6 shows the relative amplitude of the luminance signal arising from this pair of strip filters. The curve of this figure, and those of Fig. 5, are drawn for the strip filters only, the characteristics of the camera tube and associated apparatus (which, of course, are superimposed multiplicatively) being ignored. The rise in the green will be noted. This can, if desired, be corrected by providing an additional plain magenta filter.

Figure 7:
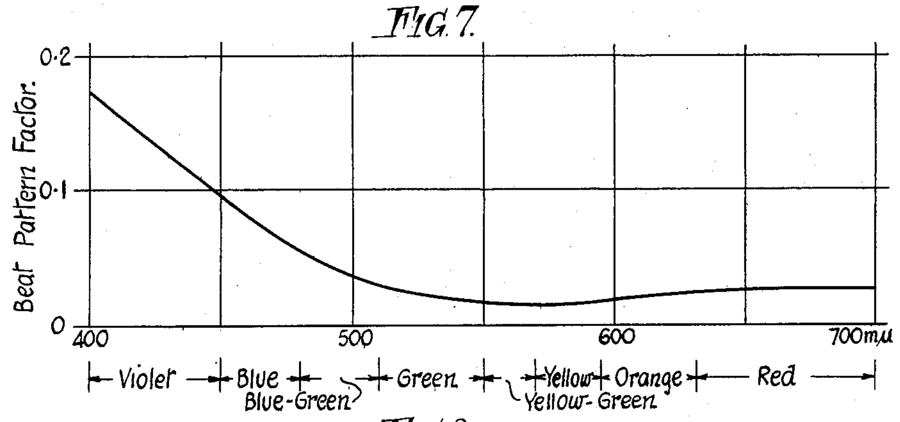
Fig. 7 shows the relative beat pattern of the filters of Fig. 5.

Referring to Fig. 7 which shows the relative beat pattern amplitudes obtained, it will be noted how serious it is strong beat pattern amplitudes from violet up to about blue.

Figure 8:
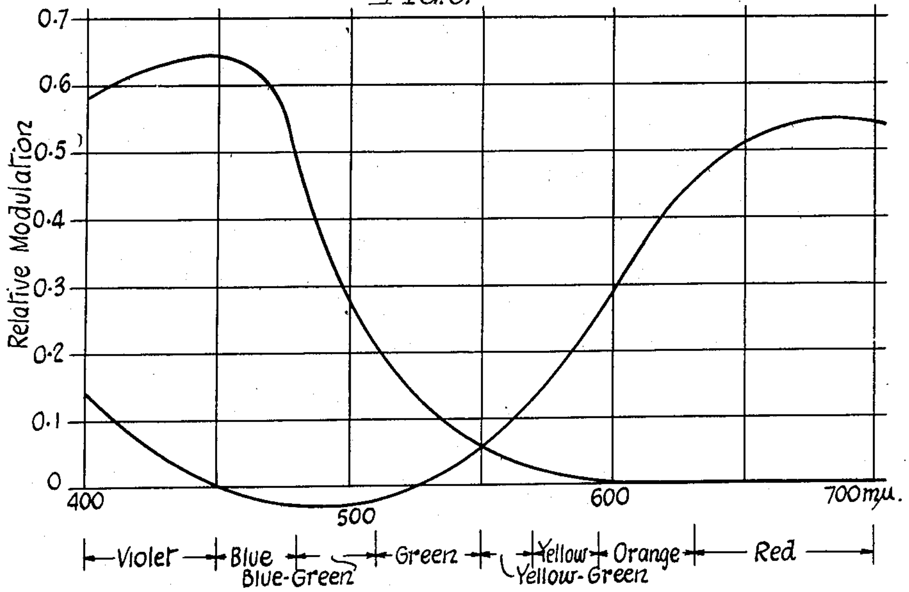
Fig. 8 shows the filters of Fig. 5 with the addition of a neutral density strip between the filter strips.
Figure 9:
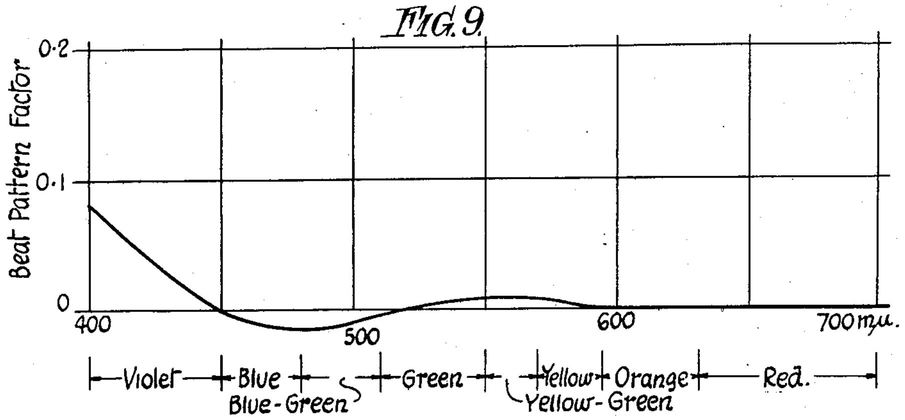
Fig. 9 shows the relative beat pattern of the filters of Fig. 8.

Fig. 8 shows characteristic curves corresponding to those of Fig. 5, but drawn for the case where, in accordance with this invention, the spaces in the strip filters are no longer clear but are given neutral densities of 0.14 and 0.04 respectively (these are practical figures), while Fig. 9 shows, in the same manner as Fig. 7, the resultant relative beat amplitudes obtained. Comparing Figs. 9 and 7, it will be at once apparent that an enormous reduction of beat pattern amplitude is obtained, especially over the color range blue to green while blue-red cross talk is also greatly reduced.

Any process known per se may be used for making strip filters for carrying out this invention. A preferred process is as follows:—

A master strip pattern in black and white is photographed onto a film having a normal single emulsion. The exposure is made long enough to produce substantial saturation density on normal development. This development produces a set of strips each consisting of silver with very little silver bromide, separated by strips which should theoretically be only silver bromide, but in which, owing to imperfections, small amounts of silver may be present. This, however, is unimportant. The film is now given a short uniform exposure sufficient to produce a latent image in the strips of silver bromide, and is then "color developed." This process is such as to produce dye wherever silver bromide is developed to silver. The exposure for this purpose is so chosen as to produce the desired maximum color density of about 0.5. After this, the film is "fixed," that is to say, all silver bromide is dissolved out, and then submitted to a slow "bleaching" process in which the silver is dissolved out. As there is relatively little silver in the dyed portions, these are cleared before the non-dyed portions, and the bleaching process is carried on slowly until the residual silver is such as to produce the desired neutral density.

It will be noted that the above process, which is only one of many possibilities, has the advantage that no registration problems of any sort are involved.

When two such filters of differing strip pitch are made, they may be placed together without involving any sort of registration problem. Indeed it is not even necessary for the strips to be parallel, and in fact the effective pitch of either can be varied by changing its inclination to the scanning lines.

Instead of using neutral density strips (spaces) slight coloration may be employed.

If desired, any residual difference frequency beat may be compensated for by providing an additional compensating filter in the form of a difference frequency, neutral density, sinusoidal strip frequency.

I claim:

1. A color filter device for use with a color television system wherein separable color signals are obtained by interposing the device in the picture imaging light path to the photo-electric cathode of a camera tube, said device having regularly and relatively differently spaced sets of filter strips, the sets being of different colors, there being an interval in the color scale between the color at which the density of the strips of any one set falls away towards the density of the space between two filter strips thereof, and the color at which the density of another set of strips increases from the space density and approaches its maximum value, the filter device producing in the strip separation spaces the required neutral density, whereby light of any one color traversing the filter device is modulated by its associated set of filter strips but is substantially unmodulated by the filter strips associated with other wave lengths of light, the filter device being adapted to be arranged with respect to the direction of line scanning in the camera tube so that different color picture signals are generated by said tube during the scanning of said cathode, the color picture signals thereby produced being carried upon different separable fundamental frequencies, determined by the sequential positioning of said color strips in the sets thereof.

2. A filter device as claimed in claim 1, wherein the filter strips are arranged so that they may be effectively perpendicular to the direction of the scanning line of the camera tube.

3. A filter device as claimed in claim 1, wherein the uniform density is provided as a neutral tint.

4. A filter device as claimed in claim 1, wherein the spaces of uniform density are faintly colored.

References Cited in the file of this patent

UNITED STATES PATENTS

| | | |
|---|---|---|
| 2,644,854 | Sziklai | July 7, 1953 |
| 2,661,391 | Bedford | Dec. 1, 1953 |